(12) United States Patent
Kim et al.

(10) Patent No.: US 10,379,658 B2
(45) Date of Patent: Aug. 13, 2019

(54) TOUCH SENSING APPARATUS INCLUDING DRIVING ELECTRODES AND SENSING ELECTRODES PROVIDED BY SINGLE LAYER AND METHOD FOR SENSING TOUCH AND TOUCH SCREEN APPARATUS USING THE SAME

(71) Applicant: Samsung Electronics Co., Ltd., Suwon-Si, Gyeonggi-Do (KR)

(72) Inventors: Jung-woo Kim, Hwaseong-si (KR); Young-jun Yun, Seongnam-si (KR); Myoung-hoon Jung, Seoul (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 253 days.

(21) Appl. No.: 14/196,430

(22) Filed: Mar. 4, 2014

(65) Prior Publication Data

US 2014/0253481 A1    Sep. 11, 2014

(30) Foreign Application Priority Data

Mar. 5, 2013  (KR) ........................ 10-2013-0023573

(51) Int. Cl.
*G06F 3/041* (2006.01)
*G06F 1/3234* (2019.01)
*G06F 3/045* (2006.01)

(52) U.S. Cl.
CPC .......... *G06F 3/0416* (2013.01); *G06F 1/3262* (2013.01); *G06F 3/045* (2013.01)

(58) Field of Classification Search
CPC .............................. G06F 1/3262; G06F 3/0416
See application file for complete search history.

(56) References Cited

U.S. PATENT DOCUMENTS 4,296,406 A * 10/1981 Pearson .................. G01L 1/205
178/18.05
7,205,983 B2 * 4/2007 Raap ...................... G06F 3/0414
345/173

(Continued)

FOREIGN PATENT DOCUMENTS

JP    2011-076265 A    4/2011
KR    2010-0120618 A    11/2010

(Continued)

OTHER PUBLICATIONS

Korean Office Action dated May 21, 2019 issued in corresponding Korean Patent Application No. 10-2013-0023573 (English translation provided).

*Primary Examiner* — Ram A Mistry
(74) *Attorney, Agent, or Firm* — Harness, Dickey & Pierce, P.L.C.

(57) ABSTRACT

The touch sensing apparatus includes a driving unit and a touch sensing unit, a scan region selecting unit, and a control unit. The driving unit and the touch sensing unit arranged at a touch panel are electrically connected to driving electrodes and sensing electrodes, respectively. The scan region selecting unit controls the driving unit and determines a narrowed scan region including a touched location by dividing a touch region of the touch panel into a plurality of scan regions, scanning each of the scan regions, and selecting a scan region including the touched location at least for once. The control unit controls the scan region selecting unit and the driving unit and determines the narrowed scan region including the touched location and sense the touched location by inputting signals in a time-division manner to a plurality of scan lines included in the narrowed scan region.

7 Claims, 6 Drawing Sheets

(56) References Cited

U.S. PATENT DOCUMENTS

| | | | | |
|---|---|---|---|---|
| 7,978,270 B2* | 7/2011 | Wu | ................... | G02F 1/13338 |
| | | | | 345/173 |
| 2008/0158167 A1* | 7/2008 | Hotelling | .............. | G06F 1/3262 |
| | | | | 345/173 |
| 2011/0122073 A1 | 5/2011 | Chen et al. | | |

FOREIGN PATENT DOCUMENTS

| KR | 10-2011-0072620 A | 6/2011 |
|---|---|---|
| KR | 2011-0086749 A | 7/2011 |
| KR | 10-1105978 B1 | 1/2012 |

\* cited by examiner

TOUCH SENSING APPARATUS INCLUDING DRIVING ELECTRODES AND SENSING ELECTRODES PROVIDED BY SINGLE LAYER AND METHOD FOR SENSING TOUCH AND TOUCH SCREEN APPARATUS USING THE SAME

CROSS-REFERENCE TO RELATED APPLICATIONS

This application claims priority under 35 U.S.C. § 119 to Korean Patent Application No. 10-2013-0023573, filed on Mar. 5, 2013, in the Korean Intellectual Property Office, the disclosure of which is incorporated herein in its entirety by reference.

BACKGROUND

1. Field

Example embodiments relate to apparatuses and methods for sensing a touch and touch screen apparatuses employing the same, and more particularly, to touch sensing apparatuses that may be driven with a low voltage, methods of sensing a touch, and touch screen apparatuses employing the same.

2. Description of the Related Art

A touch screen apparatus is an apparatus for receiving inputs directly on a display screen for performing a particular software operation by sensing location of, e.g., a finger of a user or a pen when the finger or the pen touches a particular location on the display screen. To this end, touch screen apparatuses are manufactured by arranging a touch panel onto a display panel. Types of touch panels include resistance film type, electrostatic capacitance type, surface acoustic wave (SAW) type, infrared light detecting type, piezoelectric type, etc.

In case of the resistant film type, performance (e.g., light transmittance) is significantly affected by surface resistance of a transparent electrode. The greater the surface resistance is, the higher the driving voltage is. The smaller the surface resistance is, the lower the driving voltage is. In a resistant film type touch panel, a crossing point is detected by sequentially scanning row lines. This method constantly consumes power and a period of time elapses in proportion to the number of row lines.

SUMMARY

Methods and apparatuses for sensing touches with reduced power consumption and reduced scanning time and touch screen apparatuses employing the same are provided.

Additional aspects of the present inventive concepts will be set forth in part in the description which follows and, in part, will be apparent from the description, or may be learned by practice of the presented example embodiments.

According to example embodiments, a method of sensing a touch may include determining a narrowed sub-scan region including a touched location by performing a series of operations for at least once, the series of operations including dividing a scan region including the touched location into a plurality of sub-scan regions, scanning each of the sub-scan regions, and selecting a sub-scan region including the touched location, and sensing the touched location by inputting signals in a time-division manner to a plurality of scan lines included in the narrowed sub-scan region.

During the selecting of the sub-scan region including the touched location, signals may be simultaneously input to a plurality of scan lines included in each of the sub-scan regions.

During the scanning of each of the sub-scan regions, scan signals may be simultaneously input to a plurality of scan lines included in each of the sub-scan regions.

The sensing of the touch location may continue until a single scan line including the touch location is determined.

The scanning each of the sub-scan regions may be performed in a regional scanning manner.

According to example embodiments, a touch sensing apparatus may include a driving unit and a touch sensing unit configured to sense a touch and arranged at a touch panel, a driving unit and a touch sensing unit electrically connected to a plurality of driving electrodes and a plurality of sensing electrodes respectively, a scan region selecting unit, which controls the driving unit to determine a narrowed sub-scan region including a touched location by performing a series of operations for at least once, the series of operations including dividing a scan region including the touched location into a plurality of sub-scan regions, scanning each of the sub-scan regions and selecting a sub-scan region including the touched location, and a control unit, which controls the scan region selecting unit and the driving unit to determine the narrowed sub-scan region including the touched location and to sense the touched location by inputting signals in a time-division manner to a plurality of scan lines included in the narrowed sub-scan region.

The driving electrodes and the sensing electrodes may be formed on a same layer of the touch panel.

The driving electrodes and the sensing electrodes may cross each other defining an opening at an intersection, and the touch sensing apparatus may further include a sensing material filling the opening.

The sensing material may include a material, a resistance of which changes based on a pressure of the touch.

According to example embodiments, a touch screen apparatus may include a touch sensing apparatus, and a display panel configured to display images, wherein the touch sensing apparatus includes a driving unit and a touch sensing unit, which are electrically connected to a plurality of driving electrodes and a plurality of sensing electrodes, and arranged at a touch panel for sensing a touch, a scan region selecting unit, which controls the driving unit to determine a narrowed sub-scan region including a touched location by performing a series of operations for at least once, the series of operations including dividing a scan region including the touched location into a plurality of sub-scan regions, scanning each of the sub-scan regions and selecting a sub-scan region including the touched location; and a control unit, which controls the scan region selecting unit and the driving unit to determine the narrowed sub-scan region including the touched location and to sense the touched location by inputting signals in a time-division manner to a plurality of scan lines included in the narrowed sub-scan region.

During the selecting of the sub-scan region including the touched location, signals may be simultaneously input to a plurality of scan lines included in each of the sub-scan regions.

The plurality of driving electrodes and the plurality of sensing electrodes may be formed on a same layer of the touch panel.

The driving electrodes and the sensing electrodes cross each other defining an opening at an intersection, and the touch sensing apparatus may further includes a sensing material region filling the opening.

The sensing material region may includes a material, a resistance of which changes based on a pressure of the touch.

BRIEF DESCRIPTION OF THE DRAWINGS

These and/or other aspects of the present inventive concepts will become apparent and more readily appreciated from the following description of the example embodiments, taken in conjunction with the accompanying drawings of which.

DETAILED DESCRIPTION

The present inventive concepts will now be described more fully with reference to the accompanying drawings, in which example embodiments are shown. The inventive concepts may, however, be embodied in many different forms and should not be construed as being limited to the example embodiments set forth herein; rather, these example embodiments are provided so that this disclosure will be thorough and complete, and will fully convey the concepts of the invention to those skilled in the art. In the drawings, the thicknesses of layers and regions are exaggerated for clarity. Like reference numerals in the drawings denote like elements, and thus their description will be omitted.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. As used herein the term "and/or" includes any and all combinations of one or more of the associated listed items. Other words used to describe the relationship between elements or layers should be interpreted in a like fashion (e.g., "between" versus "directly between," "adjacent" versus "directly adjacent," "on" versus "directly on").

It will be understood that, although the terms "first", "second", etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of example embodiments.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises", "comprising", "includes" and/or "including," if used herein, specify the presence of stated features, integers, steps, operations, elements and/or components, but do not preclude the presence or addition of one or more other features, integers, steps, operations, elements, components and/or groups thereof.

Example embodiments are described herein with reference to cross-sectional illustrations that are schematic illustrations of idealized embodiments (and intermediate structures) of example embodiments. As such, variations from the shapes of the illustrations as a result, for example, of manufacturing techniques and/or tolerances, are to be expected. Thus, example embodiments should not be construed as limited to the particular shapes of regions illustrated herein but are to include deviations in shapes that result, for example, from manufacturing. For example, an implanted region illustrated as a rectangle may have rounded or curved features and/or a gradient of implant concentration at its edges rather than a binary change from implanted to non-implanted region. The regions illustrated in the figures are schematic in nature and their shapes are not intended to illustrate the actual shape of a region of a device and are not intended to limit the scope of example embodiments. It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

Figure 1:
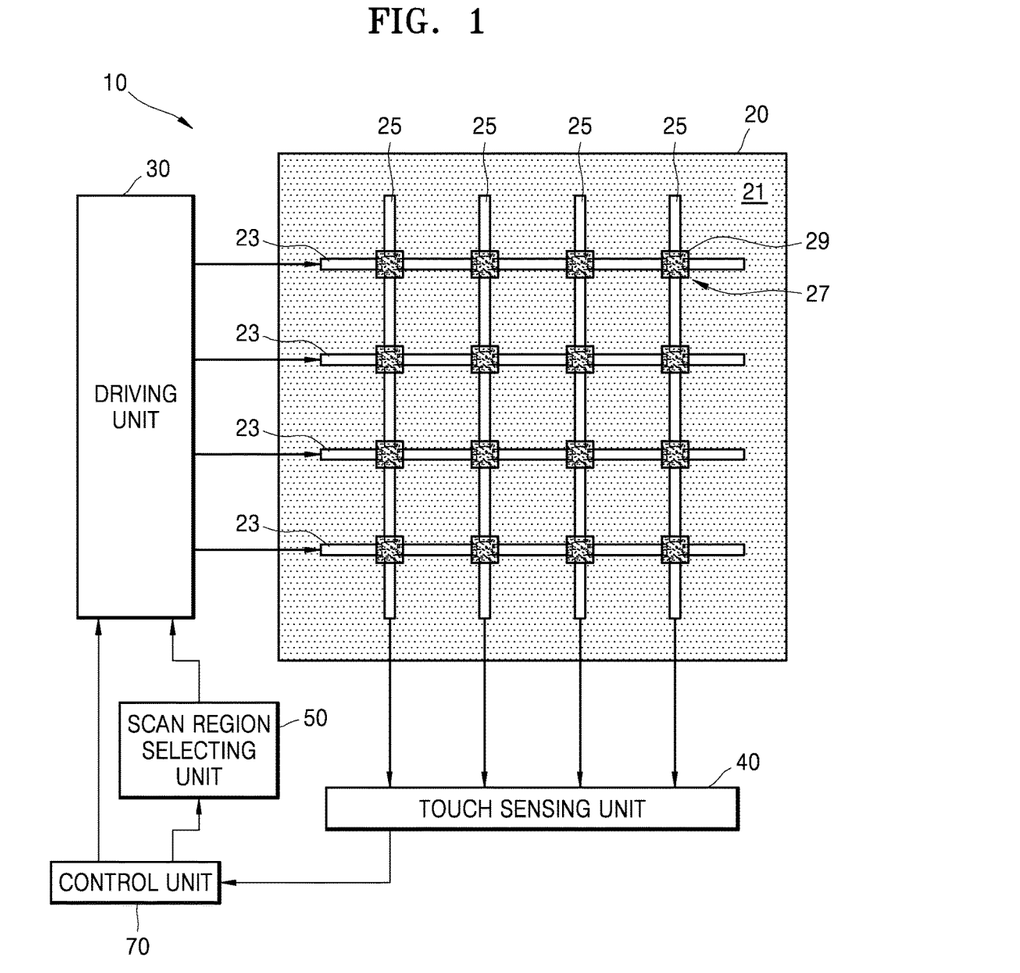
FIG. 1 is a schematic view of an touch sensing apparatus according to an example embodiment of the present inventive concepts.

FIG. 1 is a schematic view of a touch sensing apparatus 10 according to an example embodiment of the present inventive concepts.

Referring to FIG. 1, the touch sensing apparatus 10 may include a driving unit 30 electrically connected to a plurality of driving electrodes 23 to which scan signals are input, a touch sensing unit 40 electrically connected to a plurality of sensing electrodes 25 for sensing a touch, a scan region selecting unit 50, and a control unit 70.

Figure 2:
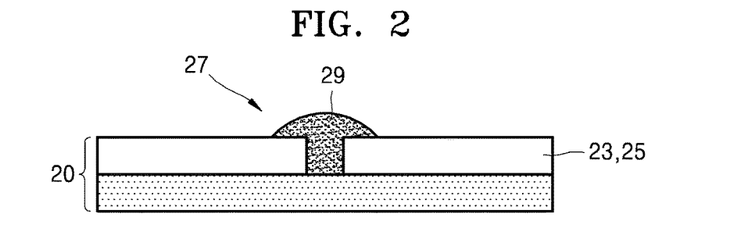
FIG. 2 is a sectional view of an example of touch panels applicable to the touch sensing apparatus of FIG. 1.

The plurality of driving electrodes 23 and the plurality of sensing electrodes 25 may be arranged at a touch region 21 of a touch panel 20 to sense a touch. The touch region 21 may correspond to a display screen of a touch screen apparatus including the touch sensing apparatus 10. As shown in FIG. 2, the driving electrodes 23 and the sensing electrodes 25 may be formed on a same layer of the touch panel 20 to cross each other and define an opening at an intersection. The driving electrodes 23 and the sensing electrodes 25 may be formed as transparent electrodes.

Referring to FIG. 2, the opening may be filled with a sensing material 29, which is formed to electrically connect the driving electrodes 23 to the sensing electrodes 25, thereby forming a touch sensing area 27. The touch panel 20 may be a 2-dimensional array of the touch sensing areas 27.

As described above, when the driving electrodes 23 and the sensing electrodes 25 are formed on the same layer to cross each other and define the openings at the intersections, the electrodes may be formed by a single layer. As a result, transmittance of the touch panel 20 may be improved.

Instead of forming the driving electrodes and the sensing electrodes on a same layer, the driving electrodes 23 and the sensing electrodes 25 may be formed on different layers to cross each other, and the sensing material 29 may be formed and electrically connect the driving electrodes 23 to the sensing electrodes 25 at a crossing point.

Figure 4A:
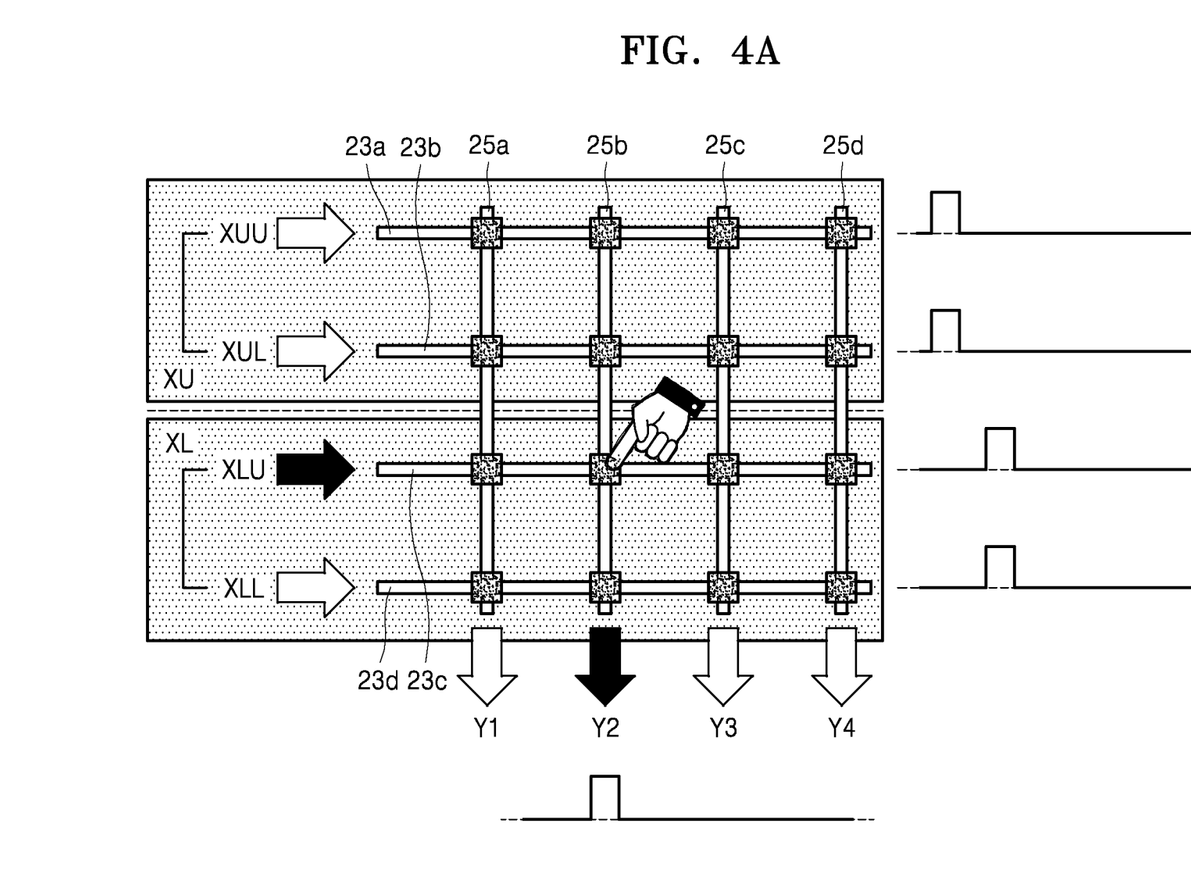
FIGS. 4A and 4B show methods of driving the touch sensing apparatus according to an example embodiment of the present inventive concepts.

The scan region selecting unit 50 is configured to control the driving unit 30 and determine a narrowed sub-scan region including a touched location by performing at least one series or set of operations including dividing a scan region into a plurality of sub-scan regions, scanning each of the scan regions, and selecting a sub-scan region including the touch location. As a result, the narrowed sub-scan region including the touched location may be determined, and the narrowed sub-scan region including the touched location may include a plurality of scan lines, e.g., the plurality of driving electrodes 23. As shown in FIG. 4A, each of the scan regions may be sequentially scanned. Alternatively, the plurality of scan regions may be scanned at the same time.

As described below with reference to FIGS. 4A and 4B, the narrowed sub-scan region including the touched location may be determined by dividing the touch region 21 into, e.g., two scan regions, and scanning the two scan regions simultaneously.

Furthermore, as described below with reference to FIG. 3, the narrowed sub-scan region including the touched location may be determined by dividing a scan region including the touched location into a plurality of sub-scan regions and scanning each of the sub-scan regions for twice or a greater number of times. In case of determining the narrowed sub-scan region including the touched location by performing the scanning operation for twice or a greater number of times, as described below with reference to FIG. 3, the narrowed sub-scan region including the touched location may be determined by performing the operation for dividing the touch region 21 into a plurality of sub-scan regions, scanning each of the sub-scan regions, selecting a sub-scan region including the touched location, dividing the selected sub-scan region into a plurality of sub-sub-scan regions, and scanning each of the sub-sub-scan regions for at least once.

During the selection of a sub-scan region including the touched location, signals may be simultaneously input to a plurality of scan lines included in the sub-scan regions, as shown in FIG. 4A.

Figure 4B:
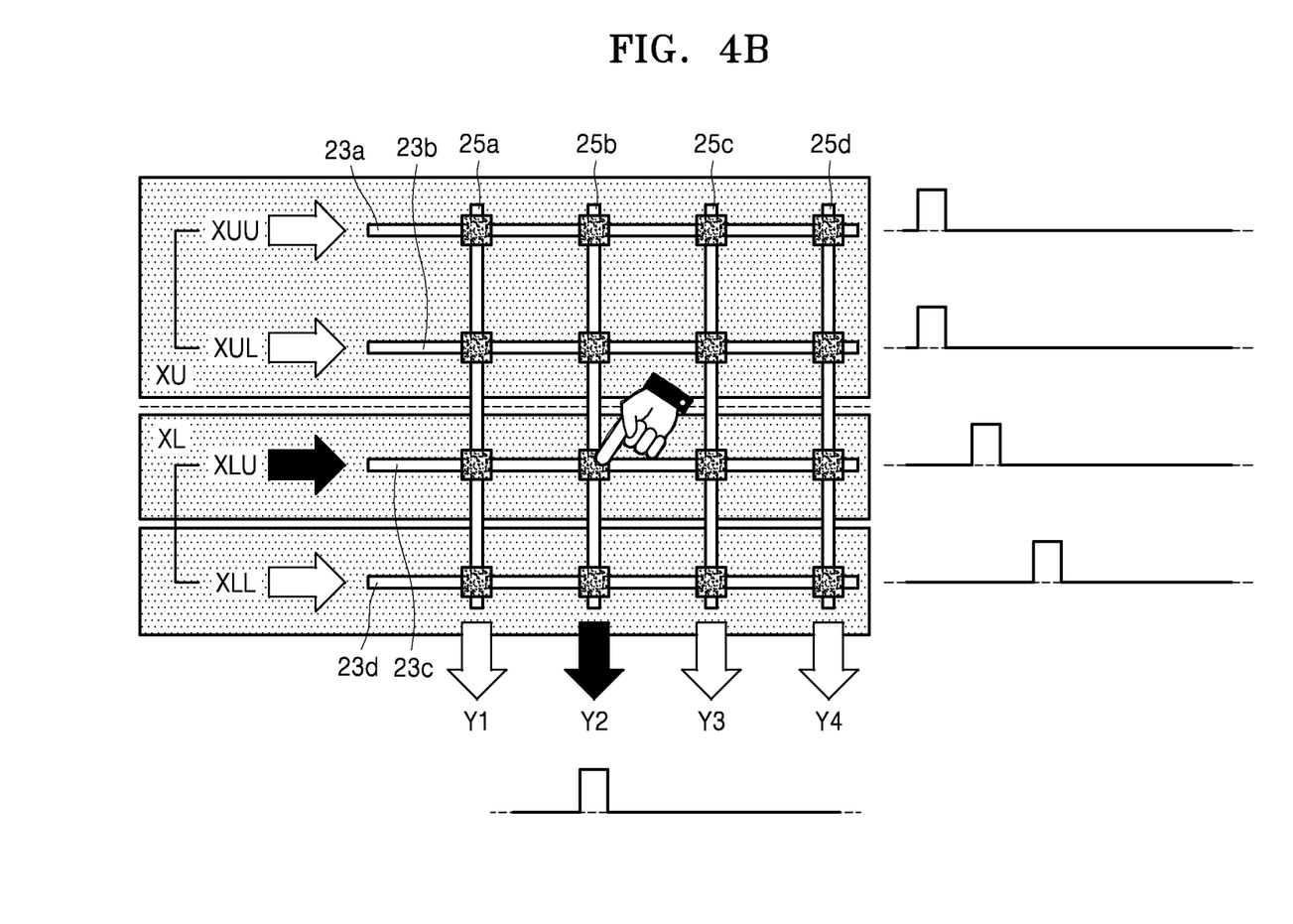

Further, the narrowed sub-scan region including the touched location may include a plurality of scan lines, e.g., the plurality of driving electrodes 23, as shown in FIG. 4B. When the narrowed sub-scan region including the touched location is selected, the driving unit 30 may input signals to the plurality of scan lines included in the narrowed sub-scan region in a time-division manner, thereby sensing the precise touched location.

The control unit 70 may be configured to control the scan region selecting unit 50 and the driving unit 30 and determine the narrowed sub-scan region including the touched location. Further, the control unit 70 may be configured to control the scan region selecting unit 50 and the driving unit 30 and input signals in a time-division manner to the plurality of scan lines included in the narrowed sub-scan region, which includes the touched location, such that the touch sensing unit 40 senses the touched location.

Figure 3:
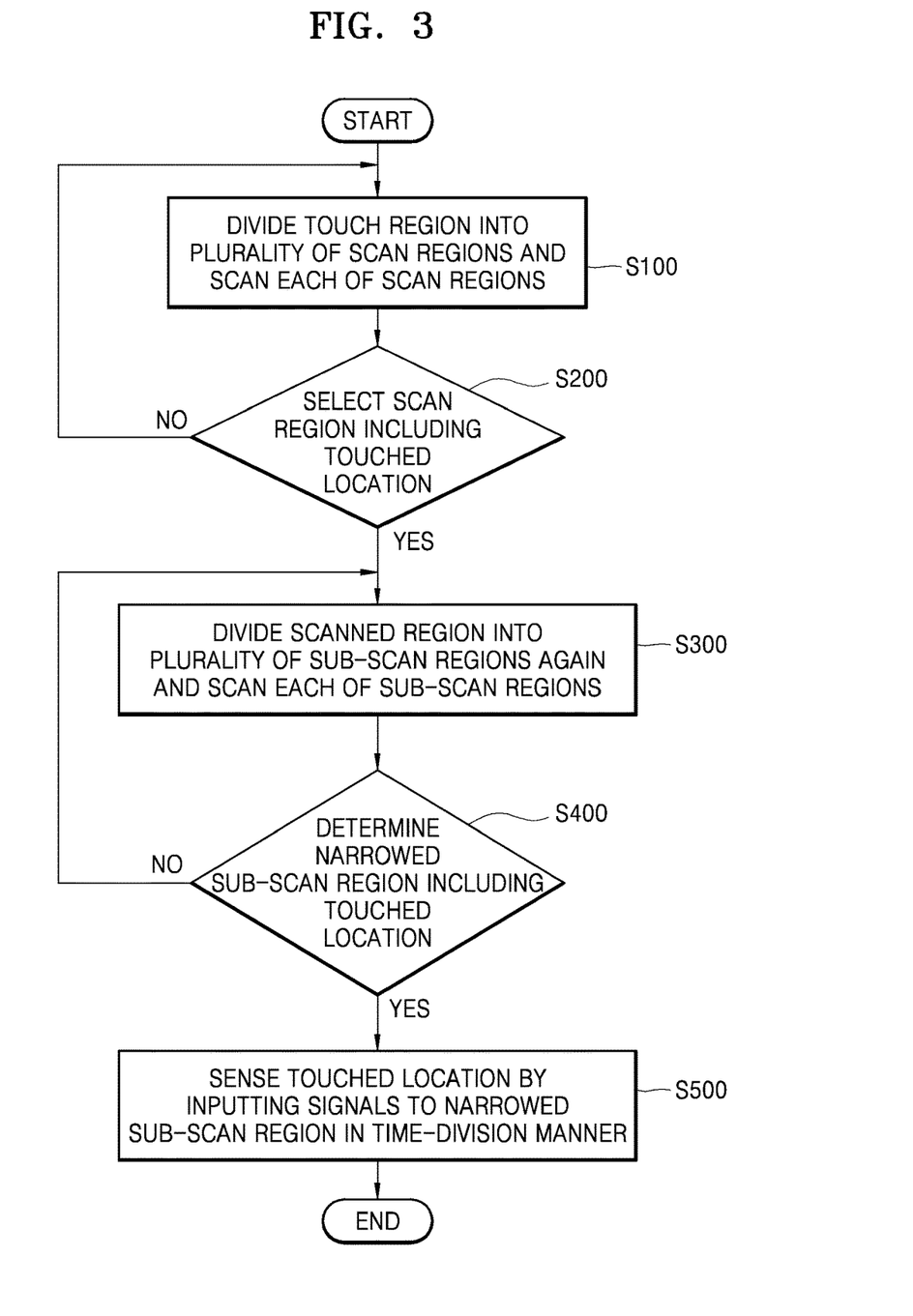
FIG. 3 is a flowchart showing a method of sensing a touch according to an example embodiment of the present inventive concepts.

FIG. 3 is a flowchart showing a method of sensing a touch according to an example embodiment of the present inventive concepts.

Referring to FIG. 3, the touch region 21 may be divided into a plurality of scan regions and each of the scan regions is scanned (operation S100). For example, the touch region 21 may be divided into two scan regions and each of the two scan regions may be scanned. For example, during the scanning of each of the scan regions, each of the scan regions may include a plurality of scan lines, e.g., the plurality of driving electrodes 23, and scan signals may be simultaneously input to the plurality of scan lines located in each of the scan regions. A scan region including a touched location may be sensed and selected by scanning each of the scan regions (operation S200).

Next, the selected scan region may be divided into a plurality of sub-scan regions and each of the sub-scan regions is scanned (operation S300). For example, the selected scan region may be divided into two sub-scan regions and each of the two sub-scan regions may be scanned. A narrowed sub-scan region including the touched location may be determined by scanning each of the sub-scan regions as described above (operation S400). The narrowed sub-scan region including the touched location may be selected by dividing the touch region 21 into a plurality of scan regions, scanning each of the scan regions, selecting a scan region including the touched location, dividing the selected scan region into a plurality of sub-scan regions, and scanning each of the sub-scan regions for at least once.

For example, when the narrowed sub-scan region including the touched location is determined by dividing the touch region 21 into two scan regions and scanning each of the two scan regions once, the operations S100 and S200 may be omitted.

When the narrowed sub-scan region including the touched location is determined, the touched location may be detected by inputting signals to a plurality of scan lines included in the narrowed sub-scan region in a time-division manner (operation S500). The narrowed sub-scan region including the touched location may include a plurality of scan lines, e.g., the plurality of driving electrodes 23.

For example, the operation for determining the narrowed sub-scan region including the touched location may be repeatedly performed until the narrowed sub-scan region including the touched location includes a single scan line, e.g., a single driving electrode.

Figure 5:
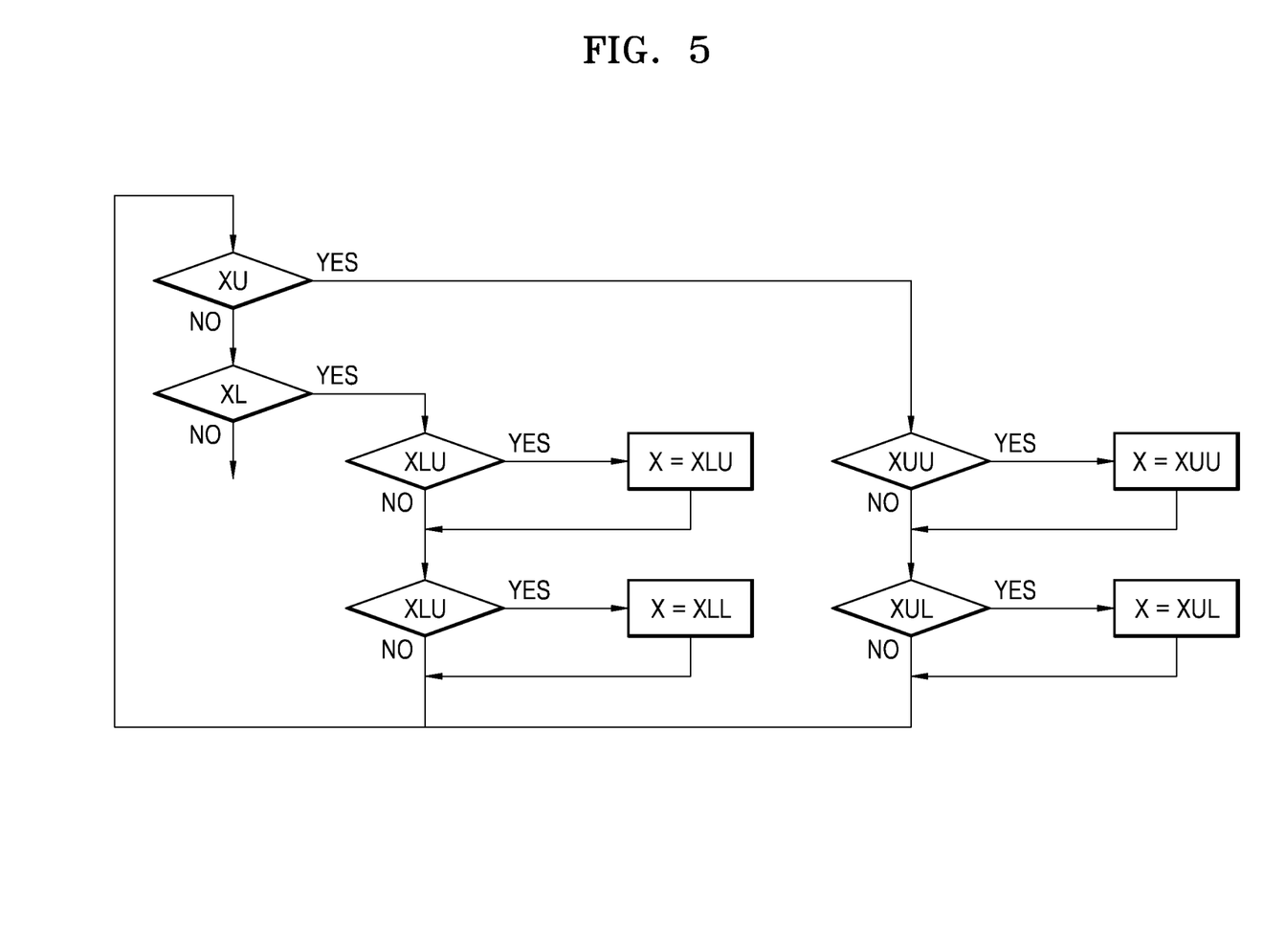
FIG. 5 is a flowchart of the methods shown in FIGS. 4A and 4B.

FIGS. 4A and 4B show methods of driving the touch sensing apparatus 10 according to an example embodiment of the present inventive concepts. FIG. 5 is a flowchart of the methods shown in FIGS. 4A and 4B. FIGS. 4A, 4B, and 5 illustrate examples that the four driving electrodes 23 and the four sensing electrodes 25 are arranged in the touch region 21 of the touch panel 20, and the touch region 21 is divided into two scan regions XU and XL. For convenience of explanation, the four driving electrodes 23 will be referred to as first through fourth driving electrodes 23a, 23b, 23c, and 23d from above and the four sensing electrodes 25 will be referred to as first through fourth sensing electrodes 25a, 25b, 25c, and 25d from left.

Referring to FIGS. 4A and 5, the touch region 21 of the touch panel 20 is divided into a first scan region XU and a second scan region XL, where driving signals XUU and XUL are simultaneously input by the driving unit 30 to the scan lines included in the first scan region XU, e.g., first and second driving electrodes 23a and 23b. Further, driving signals XLU and XLL are simultaneously input by the driving unit 30 to the scan lines included in the second scan region XL, e.g., the third and fourth driving electrodes 23c and 23d. When signals output by the first through fourth sensing electrodes 25a, 25b, 25c, and 25d are detected by the touch sensing unit 40, the first scan region XU or the second scan region XL including a touched location is selected.

For example, as shown in FIGS. 4A, 4B, and 5, the second scan region XL is selected by selecting a scan region including the touched location.

The second scan region XL may correspond to a narrowed scan region including the touched location.

As shown in FIG. 4B, the narrowed scan region including the touched location, e.g., the second scan region XL, includes a plurality of scan lines, e.g., the third and fourth driving electrodes 23c and 23d, and the driving unit 30 input signals XLU and XLL to the third and fourth driving electrodes 23c and 23d in a time-division manner. As a result, the touched location is sensed based on signals output by at least a part of the first through fourth sensing electrodes 25a, 25b, 25c, and 25d. In FIGS. 4A and 4B, when signals output by the first through fourth sensing electrodes 25a, 25b, 25c, and 25d are denoted by Y1, Y2, Y3, and Y4, only the signal Y2 is sensed by the touch sensing unit 40.

For example, the narrowed scan region including the touched location may be determined by dividing the selected second scan region XL into a plurality of sub-scan regions and selecting a sub-scan region, which is smaller than the narrowed scan region, including the touched location may be performed at least once. For example, if the narrowed scan region, which includes the touched location, includes at least three driving electrodes, the narrowed sub-scan region including the touched location may be determined by dividing the narrow scan region into two sub-scan regions and selecting a narrowed sub-scan region including the touched location may be performed for at least once.

As described above, when the narrowed sub-scan region including the touched location is determined, the precise touched location may be sensed by inputting signals in a time-division manner to a plurality of scan lines included in the narrowed sub-scan region.

For example, determining the narrowed scan (or sub-scan) region including the touched location may be repeatedly performed until the narrowed scan (or sub-scan) region including the touched location includes a single scan line, e.g., a single driving electrode.

According to the touch sensing apparatuses and the methods of sensing a touch as described above, a signal may be detected only when a particular event occurs, and thus power consumption may be reduced.

Further, because regional scanning is performed instead of sequential scanning, scanning time may be half or less than the scanning time required in the related art. For example, a touched location may be precisely sensed by dividing the touch region 21 into two first scan regions, scanning each of the first scan regions to determine existence of a touched location in each of the first scan regions, and determining a narrowed scan region including the touched location by dividing a first scan region, which is determined to include the touched location, into two second scan regions, scanning each of the two second scan regions, and selecting a narrowed scan region, a second scan region determined to include the touched location, and inputting signals in a time-division manner to the narrowed scan region. Therefore, scanning time may be half or less than the scanning time required in the related art.

Figure 6:
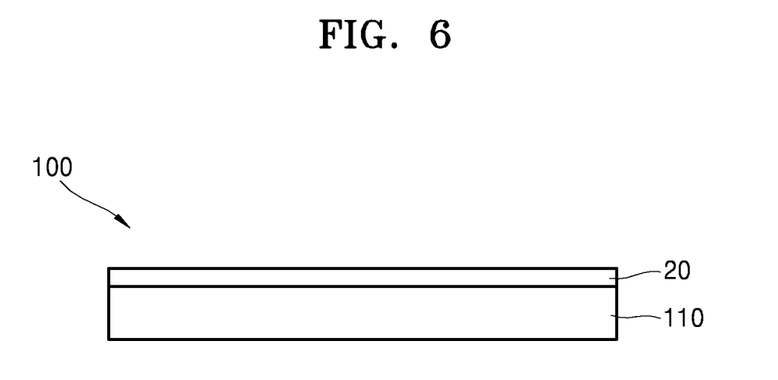
FIG. 6 is a schematic view of a stacked structure of a touch screen apparatus, to which the touch sensing apparatus according to an example embodiment of the present inventive concepts is applied.

FIG. 6 is a schematic view of a stacked structure of a touch screen apparatus 100 to which the touch sensing apparatus 10 according to example embodiments is applied.

Referring to FIG. 6, the touch screen apparatus 100 may include the touch sensing apparatus 10 and a display panel 110 and may have a structure in which the display panel 110 and the touch panel 20 of the touch sensing apparatus 10 are stacked.

For example, in the display panel 110, RGB display units for displaying colors may be 2-dimensionally arranged. The RGB display unit may correspond to a pixel of the display panel 110. For example, three display units, e.g., an R display unit for displaying red (R) color, a G display unit for displaying green (G) color, and a B display unit for displaying blue (B) color may form a pixel, where each color display unit may correspond to a sub-pixel. When the display panel 110 is arranged to display a single color, each display unit may correspond to a pixel. In terms of displaying touch sensing information input via the touch panel 20, each display unit may correspond to a pixel.

As shown in FIG. 1, in the touch panel 20, the crossing structure of the plurality of driving electrodes 23 and the plurality of sensing electrodes 25, and the touch sensing areas 27 formed of a sensing material 29 disposed at which the driving electrodes 23 and the sensing electrodes 25 cross each other may form a 2-dimensional array. The 2-dimensional arrangement of the touch sensing area 27 may be arranged in correspondence with the 2-dimensional arrangement of the display units arranged at the display panel 110. For example, at the touch panel 20, a material region at which electromagnetic changes occurs based on touches may be formed to sense a touch of, for instance, a finger or a pen, and electrodes may be formed to sense the touch.

In touch sensing apparatuses and touch sensing methods according to example embodiments, a narrowed scan region including a touched location may be determined by dividing a touch region including the touched location into a plurality of scan regions, scanning each of the scan regions, and selecting a scan region including the touched location for at least once, and the touched location may be sensed by inputting signals in a time-division manner to a plurality of scan lines included in the narrowed scan region. Therefore, a touch sensing apparatus according to example embodiment may be driven with a low voltage, and the overall scanning time may be reduced.

It should be understood that the example embodiments described herein should be considered in a descriptive sense only and not for purposes of limitation. Descriptions of features or aspects within each embodiment should typically be considered as available for other similar features or aspects in other embodiments.

What is claimed is:

1. A touch sensing apparatus comprising:
a driver and a touch sensor configured to sense a touch and arranged at a touch panel, the driver and the touch sensor electrically connected to a plurality of driving electrodes and a plurality of sensing electrodes, respectively;
a scan region selector configured to control the driver, and determine a narrowed sub-scan region including a touched location by performing a series of operations at least once, the series of operations including,
dividing a scan region including the touched location into a plurality of sub-scan regions,
scanning each of the sub-scan regions, and
selecting a sub-scan region including the touched location; and
a controller configured to control the scan region selector and the driver, the controller configured to determine the narrowed sub-scan region including the touched location and sense the touched location by inputting signals in a time-division manner to a plurality of scan lines included in the narrowed sub-scan region,
wherein in a cross-sectional view of the touch panel,
the driving electrodes and the sensing electrodes are provided vertically on a same level, the driving electrodes and the sensing electrodes cross each other and are formed discontinuously to define openings at intersections thereof, and
the touch sensing apparatus further includes a sensing material, the sensing material filling the openings at the intersections of the driving electrodes and the sensing electrodes regardless of whether the touch panel is touched by a user or not, the sensing material electrically connecting the driving electrodes and the sensing electrodes.

2. The touch sensing apparatus of claim 1, wherein, during the selecting of the sub-scan region including the touched location, signals are simultaneously input to a plurality of scan lines included in each of the sub-scan regions.

3. The touch sensing apparatus of claim 1, wherein the sensing material includes a material, a resistance of which changes based on a pressure of the touch.

4. The touch sensing apparatus of claim 1, further comprising:
a substrate on which the driving electrodes, the sensing electrodes, and the sensing material are disposed.

5. A touch screen apparatus comprising:
a touch sensing apparatus; and
a display panel configured to display images,
wherein the touch sensing apparatus includes,
a driver and a touch sensor electrically connected to a plurality of driving electrodes and a plurality of sensing electrodes, respectively, the driving electrodes and the sensing electrodes arranged at a touch panel and configured to sense a touch,
a scan region selector configured to control the driver, and determine a narrowed sub-scan region including a touched location by performing a series of operations at least once, the series of operations including,
dividing a scan region including the touched location into a plurality of sub-scan regions, and
scanning each of the sub-scan regions; and
selecting a sub-scan region including the touched location; and
a controller configured to control the scan region selector and the driver, the controller configured to determine the narrowed sub-scan region including the touched location and to sense the touched location by inputting signals in a time-division manner to a plurality of scan lines included in the narrowed sub-scan region,
wherein in a cross-sectional view of the touch panel, the driving electrodes and the sensing electrodes are provided on a same level,
the driving electrodes and the sensing electrodes cross each other and are formed discontinuously to define openings at intersections thereof, and
the touch screen apparatus further includes a sensing material, the sensing material filling the openings at intersections of the driving electrodes and the sensing electrodes regardless of whether the touch panel is touched by a user or not, the sensing material electrically connecting the driving electrodes and the sensing electrodes.

6. The touch screen apparatus of claim 5, wherein, during the selecting of the sub-scan region including the touched location, signals are simultaneously input to a plurality of scan lines included in each of the sub-scan region.

7. The touch sensing apparatus of claim 5, further comprising:
a substrate on which the driving electrodes, the sensing electrodes, and the sensing material are disposed.

* * * * *